(12) United States Patent
Gan et al.

(10) Patent No.: US 11,710,349 B2
(45) Date of Patent: Jul. 25, 2023

(54) FACIAL BEAUTY PREDICTION METHOD AND DEVICE BASED ON MULTI-TASK MIGRATION

(71) Applicant: Wuyi University, Jiangmen (CN)

(72) Inventors: Junying Gan, Jiangmen (CN); Li Xiang, Jiangmen (CN); Yikui Zhai, Jiangmen (CN); Chaoyun Mai, Jiangmen (CN); Junying Zeng, Jiangmen (CN); Zilu Ying, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 254 days.

(21) Appl. No.: 17/424,409

(22) PCT Filed: Aug. 31, 2020

(86) PCT No.: PCT/CN2020/112529
§ 371 (c)(1),
(2) Date: Jul. 20, 2021

(87) PCT Pub. No.: WO2021/052160
PCT Pub. Date: Mar. 25, 2021

(65) Prior Publication Data
US 2022/0092297 A1    Mar. 24, 2022

(30) Foreign Application Priority Data
Sep. 20, 2019   (CN) .......................... 201910893827.2

(51) Int. Cl.
*G06V 40/16*   (2022.01)
*G06F 18/22*   (2023.01)
*G06F 18/25*   (2023.01)

(52) U.S. Cl.
CPC ............ *G06V 40/174* (2022.01); *G06F 18/22* (2023.01); *G06F 18/253* (2023.01); *G06V 40/168* (2022.01)

(58) Field of Classification Search
CPC .. G06V 40/174; G06V 40/168; G06V 40/178; G06F 18/22; G06F 18/253; G06F 18/214
See application file for complete search history.

(56) References Cited

U.S. PATENT DOCUMENTS

| 11,348,022 B2 * | 5/2022 | Douglas ................. G06F 17/16 |
| 2019/0026884 A1 | 1/2019 | He et al. |

(Continued)

FOREIGN PATENT DOCUMENTS

| CN | 103714351 A | 4/2014 |
| CN | 108520213 A | 9/2018 |

(Continued)

OTHER PUBLICATIONS

Hu, Mengying et al. Weakly Supervised Image Classification through Noise Regularization, Proceedings of the IEEE/CVF Conference on Computer Vision and Pattern Recognition (CVPR), 2019, pp. 11517-11525 IEEE.

(Continued)

*Primary Examiner* — Phuoc Tran
(74) *Attorney, Agent, or Firm* — Vivacqua Crane, PLLC (57) ABSTRACT

Disclosed are a facial beauty prediction method and device based on multi-task migration. The method includes: performing similarity measurement based on a graph structure on a plurality of tasks to obtain an optimal combination of the plurality of tasks; constructing a facial beauty prediction model including a feature sharing layer based on the optimal combination; migrating feature parameters of an existing large-scale facial image network to the feature sharing layer of the facial beauty prediction model; inputting facial (Continued)

images for training to pre-train the facial beauty prediction model; and inputting a facial image to be tested to the trained facial beauty prediction model to obtain facial recognition results.

10 Claims, 4 Drawing Sheets

(56) References Cited

U.S. PATENT DOCUMENTS

2019/0213452 A1 7/2019 Ludwinski et al.
2021/0264227 A1* 8/2021 Ma .................... G06N 3/045

FOREIGN PATENT DOCUMENTS

| CN | 108629338 A | 10/2018 |
| CN | 109344855 A | 2/2019 |
| CN | 110119689 A | 8/2019 |
| CN | 110705407 A | 1/2020 |

OTHER PUBLICATIONS

Zhai, Yikui et al., BeautyNet: Joint Multiscale CNN and Transfer Learning Method for Unconstrained Facial Beauty Prediction, Computational Intelligence and Neuroscience, 14 Pages, 2019, vol. 2019, Article ID 1910624, https://doi.org/10.1155/2019/1910624.

* cited by examiner

FACIAL BEAUTY PREDICTION METHOD AND DEVICE BASED ON MULTI-TASK MIGRATION

CROSS-REFERENCE TO RELATED APPLICATIONS

This application is a national stage filing under 35 U.S.C. § 371 of international application number PCT/CN2020/112529, filed Aug. 31, 2020, which claims priority to Chinese patent application No. 2019108938272 filed Sep. 20, 2019. The contents of these applications are incorporated herein by reference in their entirety.

TECHNICAL FIELD

The present disclosure relates to the field of image processing, and in particular, to a facial beauty prediction method and device based on multi-task migration.

BACKGROUND

Facial beauty prediction technology has been widely used in the field of photography. In addition, with the development of deep learning technology, the application of deep learning technology to facial beauty prediction technology makes facial beauty prediction results more accurate and more in line with people's cognition. However, single-task learning ignores the correlation between tasks, and multi-task learning adds unnecessary combinations to a deep learning network, which increases the redundancy of deep learning tasks and also increases the burden of network training, thereby seriously affecting the efficiency of classification and recognition.

SUMMARY

The present disclosure aims to resolve at least one of the technical problems in the existing technology by providing a facial beauty prediction method and device based on multi-task migration, which reduce calculation by similarity measurement.

The technical solutions adopted by the present disclosure to resolve its problems are described as follows.

According to a first aspect of the present disclosure, a facial beauty prediction method based on multi-task migration is provided, including the following steps:

performing similarity measurement based on a graph structure on a plurality of tasks to obtain an optimal combination of the plurality of tasks, where the plurality of tasks include a main task for facial beauty prediction and several auxiliary tasks for recognition of facial beauty factors;

constructing a facial beauty prediction model based on the optimal combination, where the facial beauty prediction model includes a feature sharing layer for extracting shared image features of the plurality of tasks;

migrating feature parameters of an existing large-scale facial image network to the feature sharing layer of the facial beauty prediction model;

inputting facial images for training to pre-train the facial beauty prediction model; and inputting a facial image to be tested to the trained facial beauty prediction model to obtain facial recognition results.

According to the first aspect of the present disclosure, the performing similarity measurement based on a graph structure on a plurality of tasks to obtain an optimal combination of the plurality of tasks includes the following steps:

constructing a specific network for each of the plurality of tasks and training the specific network to obtain a feature expression $E_s(I)$ of each task;

matching vertices and paths of a plurality of the specific networks to construct a migration network among the plurality of tasks;

measuring a task tightness among the plurality of the tasks, where the task tightness is calculated according to a formula:

$$D_{s \to t} := \underset{\theta}{\arg \min E_{I \in D}} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value;

calculating a correlation matrix among the plurality of tasks, where each element in the correlation matrix is:

$$w'_{i,j} = \frac{E_{I \in D_{test}}[D_{s_i \to t}(I) > D_{s_j \to t}(I)]}{E_{I \in D_{test}}[D_{s_i \to t}(I) < D_{s_j \to t}(I)]};$$

constructing a directed acyclic graph structure by using each task as a node of the graph structure and the correlation matrix as a supervision value of the graph structure, and searching for an optimal path by minimizing a supervision budget to obtain the optimal combination of the plurality of tasks.

According to the first aspect of the present disclosure, the facial beauty prediction model further includes a pre-processing layer for pre-processing the facial images for training and the facial image to be tested, independent feature extraction layers for extracting independent features of the plurality of tasks, feature fusion layers for fusing the independent features with geometric features and texture features corresponding to each task, and classification layers.

According to the first aspect of the present disclosure, the migrating feature parameters to the feature sharing layer includes: comparing the feature parameters with basic parameters which are configured by the feature sharing layer according to the optimal combination; and migrating the feature parameters corresponding to the basic parameters.

According to the first aspect of the present disclosure, the auxiliary tasks include expression recognition, gender recognition and age recognition, and the facial recognition results include a facial beauty prediction result corresponding to the main task, and an expression recognition result, a gender recognition result and an age recognition result corresponding to the auxiliary tasks.

The above-mentioned facial beauty prediction method based on multi-task migration has at least the following beneficial effects: the similarity measurement based on the graph structure is performed on the plurality of tasks to search the correlation between the plurality of tasks and obtain the optimal combination of the plurality of tasks, and the optimal combination is combined into the facial beauty prediction model, thereby reducing the redundancy of deep learning tasks, easing the burden of network training, and improving the efficiency and precision of network classification and recognition; and the feature parameters of the existing facial image network are migrated for learning to further reduce the cost of network training.

According to a second aspect of the present disclosure, a facial beauty prediction device based on multi-task migration is provided, including:

a similarity measurement module, configured to perform similarity measurement based on a graph structure on a plurality of tasks to obtain an optimal combination of the plurality of tasks, where the plurality of tasks include a main task for facial beauty prediction and several auxiliary tasks for recognition of facial beauty factors;

a model construction module, configured to construct a facial beauty prediction model based on the optimal combination, where the facial beauty prediction model includes a feature sharing layer for extracting shared image features of the plurality of tasks;

a feature parameter migration module, configured to migrate feature parameters of an existing large-scale facial image network to the feature sharing layer of the facial beauty prediction model;

a pre-training module, configured to input facial images for training to pre-train the facial beauty prediction model; and a result obtaining module, configured to input a facial image to be tested to the trained facial beauty prediction model to obtain facial recognition results.

According to the second aspect of the present disclosure, the similarity measurement module includes:

a feature expression obtaining module, configured to construct a specific network for each of the plurality of tasks and train the specific network to obtain a feature expression $E_s(I)$ of each task;

a migration network construction module, configured to match vertices and paths of the plurality of specific networks to construct a migration network among the plurality of tasks;

a tightness measurement module, configured to measure a task tightness among the plurality of tasks, where the task tightness is calculated according to a formula:

$$D_{s \to t} := \arg\min_{\theta} E_{I \in D} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value;

a correlation processing module, configured to calculate a correlation matrix among the plurality of tasks, where each element in the correlation matrix is:

$$w'_{i,j} = \frac{E_{I \in D_{test}}[D_{s_i \to t}(I) > D_{s_j \to t}(I)]}{E_{I \in D_{test}}[D_{s_i \to t}(I) < D_{s_j \to t}(I)]};$$

a graph structure construction module, configured to construct a directed acyclic graph structure by using each task as a node of the graph structure and the correlation matrix as a supervision value of the graph structure, and search for an optimal path by minimizing a supervision budget to obtain the optimal combination of the plurality of tasks.

According to the second aspect of the present disclosure, the facial beauty prediction model further includes a pre-processing layer for pre-processing the facial images for training and the facial image to be tested, independent feature extraction layers for extracting independent features of the plurality of tasks, feature fusion layers for fusing the independent features with geometric features and texture features corresponding to each task, and classification layers.

According to the second aspect of the present disclosure, the feature sharing layer includes a parameter configurator, which is used to configure basic parameters according to the optimal combination; and the feature parameter migration module includes a matching module, which is configured to compare the feature parameters with the basic parameters and migrate the feature parameters corresponding to the basic parameters.

According to the second aspect of the present disclosure, the auxiliary tasks include expression recognition, gender recognition and age recognition, and the facial recognition results include a facial beauty prediction result corresponding to the main task, and an expression recognition result, a gender recognition result and an age recognition result corresponding to the auxiliary tasks.

The above-mentioned facial beauty prediction device based on multi-task migration has at least the following beneficial effects: the similarity measurement based on the graph structure is performed on the plurality of tasks to search the correlation between the plurality of tasks and obtain the optimal combination of the plurality of tasks, and the optimal combination is combined into the facial beauty prediction model, thereby reducing the redundancy of deep learning tasks, easing the burden of network training, and improving the efficiency and precision of network classification and recognition; and the feature parameters of the existing facial image network are migrated for learning to further reduce the cost of network training.

BRIEF DESCRIPTION OF DRAWINGS

The present disclosure will be further explained below with reference to the accompanying drawings and examples.

DETAILED DESCRIPTION

Specific embodiments of the present disclosure will be described in detail in this section, the preferred embodiments of the present disclosure are illustrated in the accompanying drawings, and the accompanying drawings are used for supplementing the literal description with graphics so that a person can intuitively and vividly understand each technical feature and overall technical solutions of the present disclosure, but cannot be understood as limitations to the scope of the present disclosure.

In the description of the present disclosure, unless otherwise specified, terms such as "provided", "mounted" and "connected" should be understood in a broad sense, and the specific meanings of the terms in the present disclosure can be reasonably determined by those skilled in the art in light of the specific contents of the technical solutions.

Figure 1:
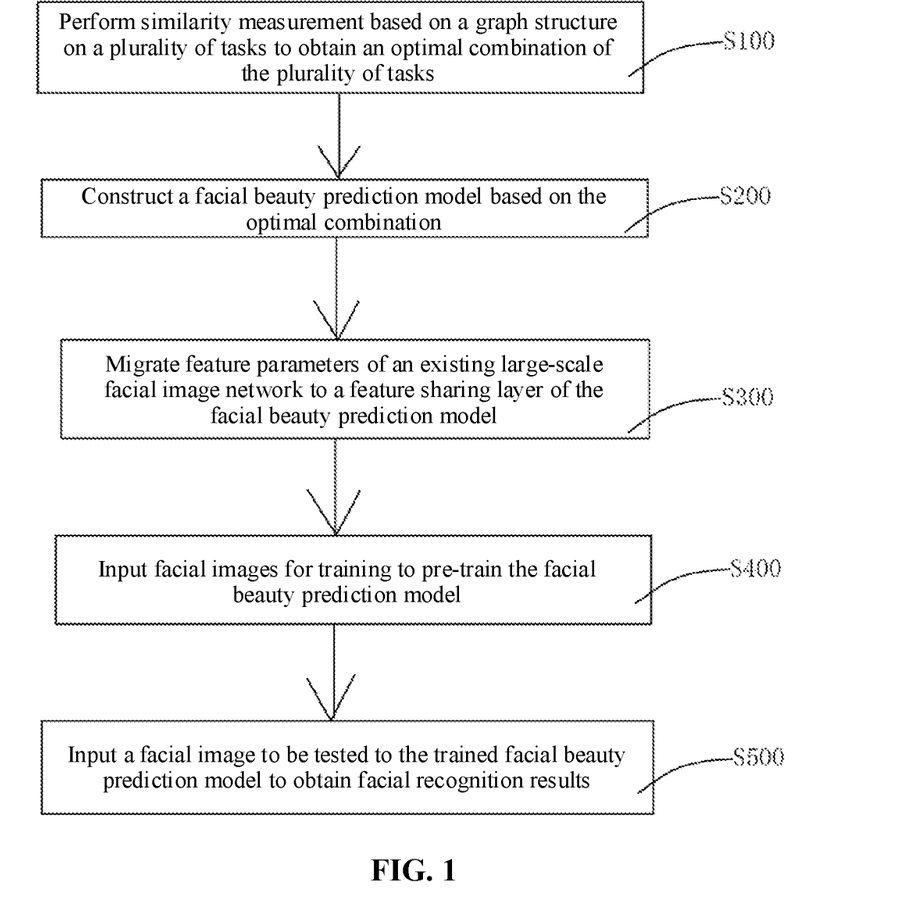
FIG. 1 is a diagram of steps of a facial beauty prediction method based on multi-task migration according to an embodiment of the present disclosure.

Referring to FIG. 1, an embodiment of the present disclosure provides a facial beauty prediction method based on multi-task migration, including the following steps S100-S500.

At step S100, similarity measurement based on a graph structure is performed on a plurality of tasks to obtain an optimal combination of the plurality of tasks. The plurality of tasks include a main task for facial beauty prediction and several auxiliary tasks for recognition of facial beauty factors.

At step S200, a facial beauty prediction model is constructed based on the optimal combination. The facial beauty prediction model includes a feature sharing layer 20 for extracting shared image features of the plurality of tasks.

At step S300, feature parameters of an existing large-scale facial image network are migrated to the feature sharing layer 20 of the facial beauty prediction model.

At step S400, facial images for training are inputted to pre-train the facial beauty prediction model.

At step S500, a facial image to be tested is inputted to the trained facial beauty prediction model to obtain facial recognition results.

Because combination of N tasks would produce N*(N−1)/2 combinations in total, if all combinations are trained and fused, the amount of training will be severely increased, and unnecessary redundancy and useless data will be generated to affect the precision of classification and recognition. In this embodiment, the similarity measurement based on the graph structure is performed on the plurality of tasks to search for the correlation between the plurality of tasks and obtain the optimal combination of the plurality of tasks, and the optimal combination is combined into the facial beauty prediction model, thereby simplifying the facial beauty prediction model, reducing the redundancy of deep learning tasks, easing the burden of network training, and improving the efficiency and precision of network classification and recognition.

Migration learning is to improve the learning of new tasks by transferring knowledge from related tasks that have been learned. The feature parameters of the existing large-scale facial image network are migrated for learning, which further reduces the cost of training the facial beauty prediction model and can also improve the precision of classification and recognition results.

The facial beauty prediction model is perfected by combining the optimal combination of multiple tasks obtained after the similarity measurement and migrating the feature parameters for learning, which simplifies the structure of the facial beauty prediction model, reduces data processing of the facial beauty prediction model to improve processing efficiency, and also avoids low correlated data to improve the precision of classification and recognition.

Figure 2:
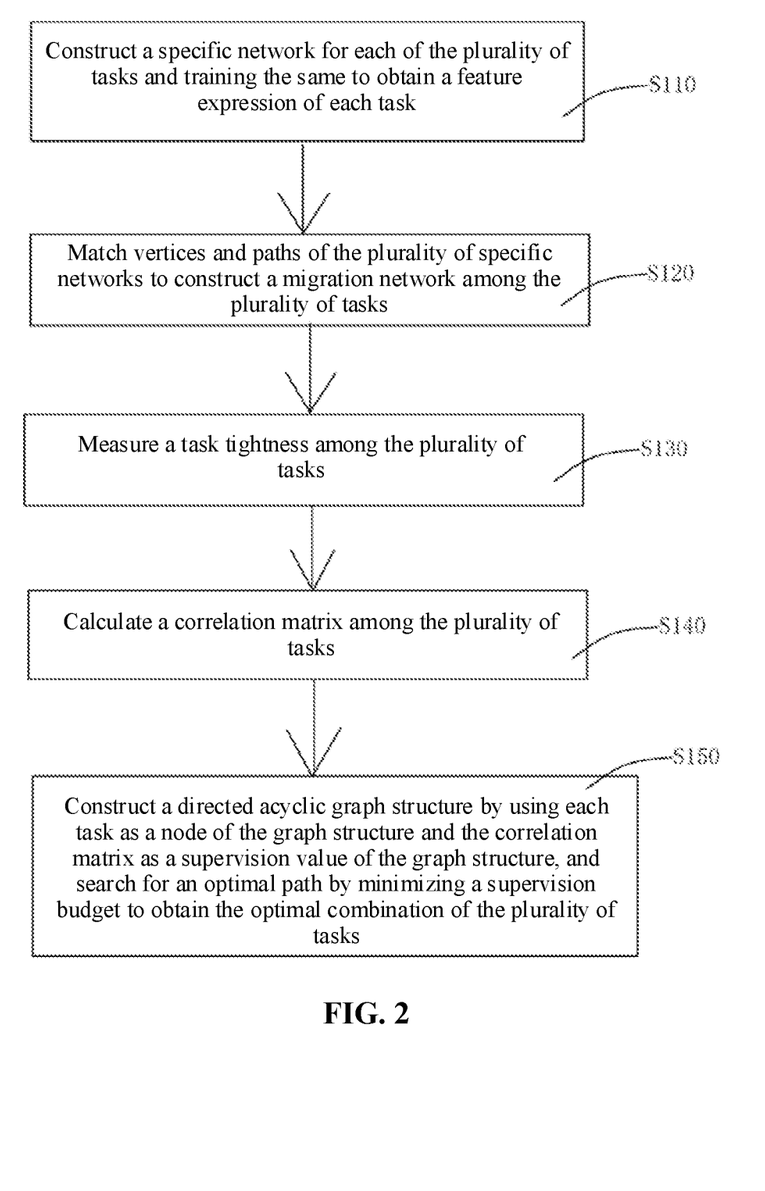
FIG. 2 is a diagram of sub-steps of step S100.

Referring to FIG. 2, further, step S100 specifically includes the following steps S110-S150.

At step S110, a specific network is constructed for each of the plurality of tasks and trained to obtain a feature expression $E_s(I)$ of each task, where each specific network has an encoder and a decoder, all encoders have the same ResNet50 structure, and each decoder corresponds to a different task.

At step S120, vertices and paths of the plurality of specific networks are matched to construct a migration network among the plurality of tasks.

At step S130, a task tightness among the plurality of tasks is measured, wherein the task tightness is calculated according to a formula:

$$D_{s \to t} := \frac{\arg\min E_{I \in D}}{\theta} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value; the migration network is a directed graph, each node of the directed graph corresponds to a task, and the weight between nodes is the task tightness.

At step S140, a correlation matrix among the plurality of tasks is calculated; specifically, for each task pair$^{(i,j)}$ in which a source task points to a target task, a test set is taken out by a hold-out method after migration; a matrix $W_t$ is constructed for each task, the output result of the matrix $W_t$ is controlled within a range [0.001, 0.999] by means of a Laplace smoothing method, and then the correlation matrix is obtained by transformation, wherein the correlation matrix reflects a similarity probability among the tasks. Each element $w_{i,j}'$ in $W_t'$ is calculated as follows:

$$w_{i,j}' = \frac{E_{I \in D_{test}}[D_{s_i \to t}(I) > D_{s_j \to t}(I)]}{E_{I \in D_{test}}[D_{s_i \to t}(I) < D_{s_j \to t}(I)]};$$

At step S150, a directed acyclic graph structure is constructed by using each task as a node of the graph structure and the correlation matrix as a supervision value of the graph structure, and an optimal path is searched for by minimizing a supervision budget to obtain the optimal combination of the plurality of tasks, that is, a problem of subgraph selection is solved based on the correlation matrix.

It should be noted that searching for the optimal vertice matching between two graphs means to find an optimal mapping function to establish a bijection between vertice sets of the two graphs, so that the difference between the corresponding vertices is minimum; the optimal path matching between the two graphs is searched for by calculating a common path matrix, the common path matrix is preferably calculated by a Kasa-algorithm, and the Kasa-algorithm is a variant of a Floyd-Warshall algorithm. After the vertice and path matching, the migration network among the plurality of tasks will be obtained.

Figure 3:
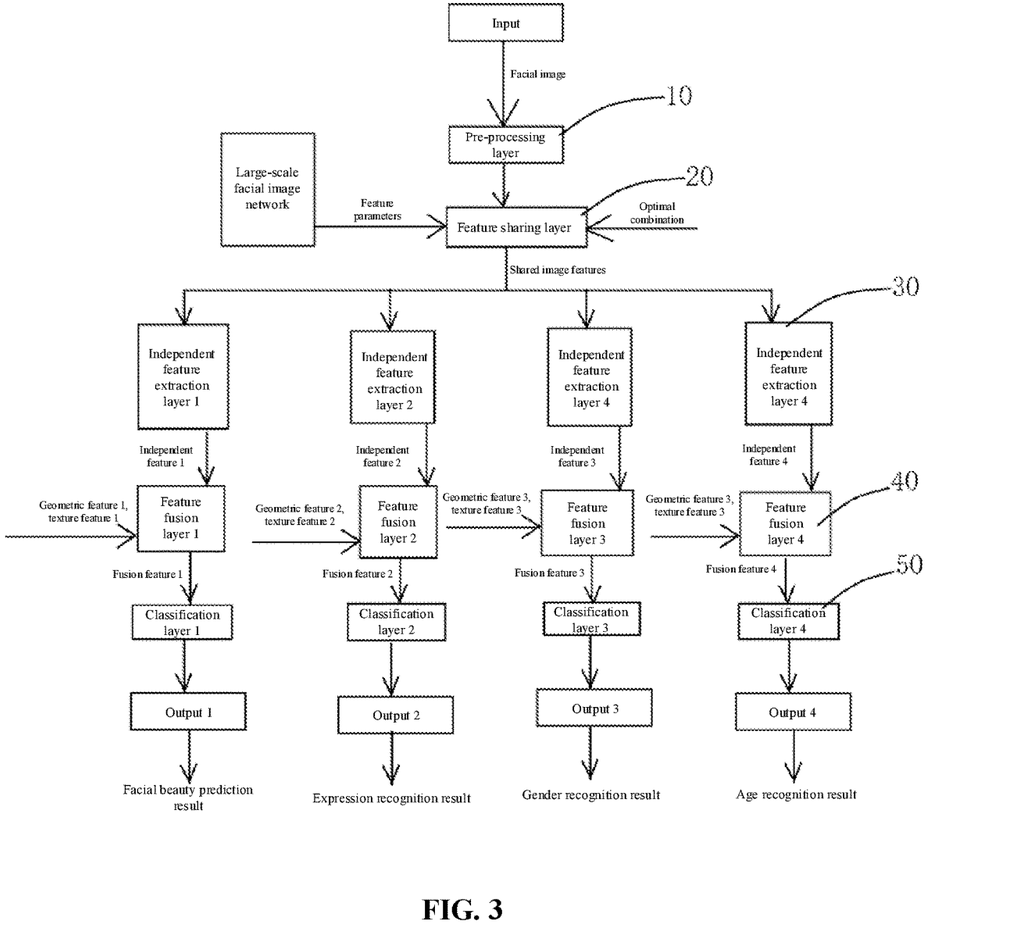
FIG. 3 is a network structure diagram of a facial beauty prediction model.

Referring to FIG. 3, the facial beauty prediction model further includes a pre-processing layer 10 for pre-processing the facial images for training and the facial image to be tested, independent feature extraction layers 30 for extracting independent features of the plurality of tasks, feature fusion layers 40 for fusing the independent features with geometric features and texture features corresponding to each task, and classification layers 50. The independent feature extraction layer 30 includes a convolutional layer, a BN layer, an activation function layer, and a pooling layer that are sequentially connected, and the classification layer 50 includes two fully connected layers.

Specifically, in the pre-training step, the facial images for training are inputted to the facial beauty prediction model, and the facial images for training are subjected to pre-processing by the pre-processing layer 10, such as gray processing and pixel normalization. The facial images for training then enter the feature sharing layer 20 and are processed by the feature sharing layer 20 to obtain a feature map with shared image features; the feature sharing layer 20 configures basic parameters according to the optimal combination of the plurality of tasks; and in the step of migrating the feature parameters to the feature sharing layer 20, the feature parameters are compared with the basic parameters, and the feature parameters corresponding to the basic parameters are migrated to eliminate unnecessary feature parameters and simplify the step of extracting shared image features. There are different independent feature extraction layers 30 corresponding to different tasks, the inputs of different independent feature extraction layers 30 are feature maps with shared image features, and different independent feature extraction layers 30 extract independent features corresponding to different tasks. Specifically, the main task includes facial beauty prediction, and the auxiliary tasks include expression recognition, gender recognition, and age recognition. There are 4 independent feature extraction layers 30, which correspond to facial beauty prediction, expression recognition, gender recognition, and age recognition, respectively. Each independent feature extraction layer 30 is connected to a feature fusion layer 40, and the feature fusion layer 40 is connected to a classification layer 50. The feature fusion layer 40 fuses independent features with geometric features and texture features according to $F_{fusion}[F_{CNN}, G, H]$ to obtain fusion features, where $F_{fusion}$ represents fusion features, G represents geometric features, and H represents texture features. The geometric features and the texture features are provided by existing image libraries or other feature extraction networks. The classification layer 50 obtains facial recognition results according to the fusion features. A large number of facial images for training are inputted to perfect the facial beauty prediction model. Specifically, the facial recognition results include a facial beauty prediction result corresponding to the main task, and an expression recognition result, a gender recognition result and an age recognition result corresponding to the auxiliary tasks.

Similarly, the facial image to be tested is processed by the trained facial beauty prediction model based on the above steps. The facial beauty prediction model outputs the facial recognition results corresponding to the facial image to be tested to complete the facial beauty prediction.

The above-mentioned facial beauty prediction method performs similarity measurement on the plurality of tasks to search for the correlation between the plurality of tasks and obtain the optimal combination of the plurality of tasks, and combines the optimal combination into the deep learning model, thereby reducing the redundancy of deep learning tasks, easing the burden of network training, and improving the efficiency and precision of network classification and recognition; and the feature parameters of the existing facial image network are migrated for learning to further reduce the cost of network training.

Figure 4:
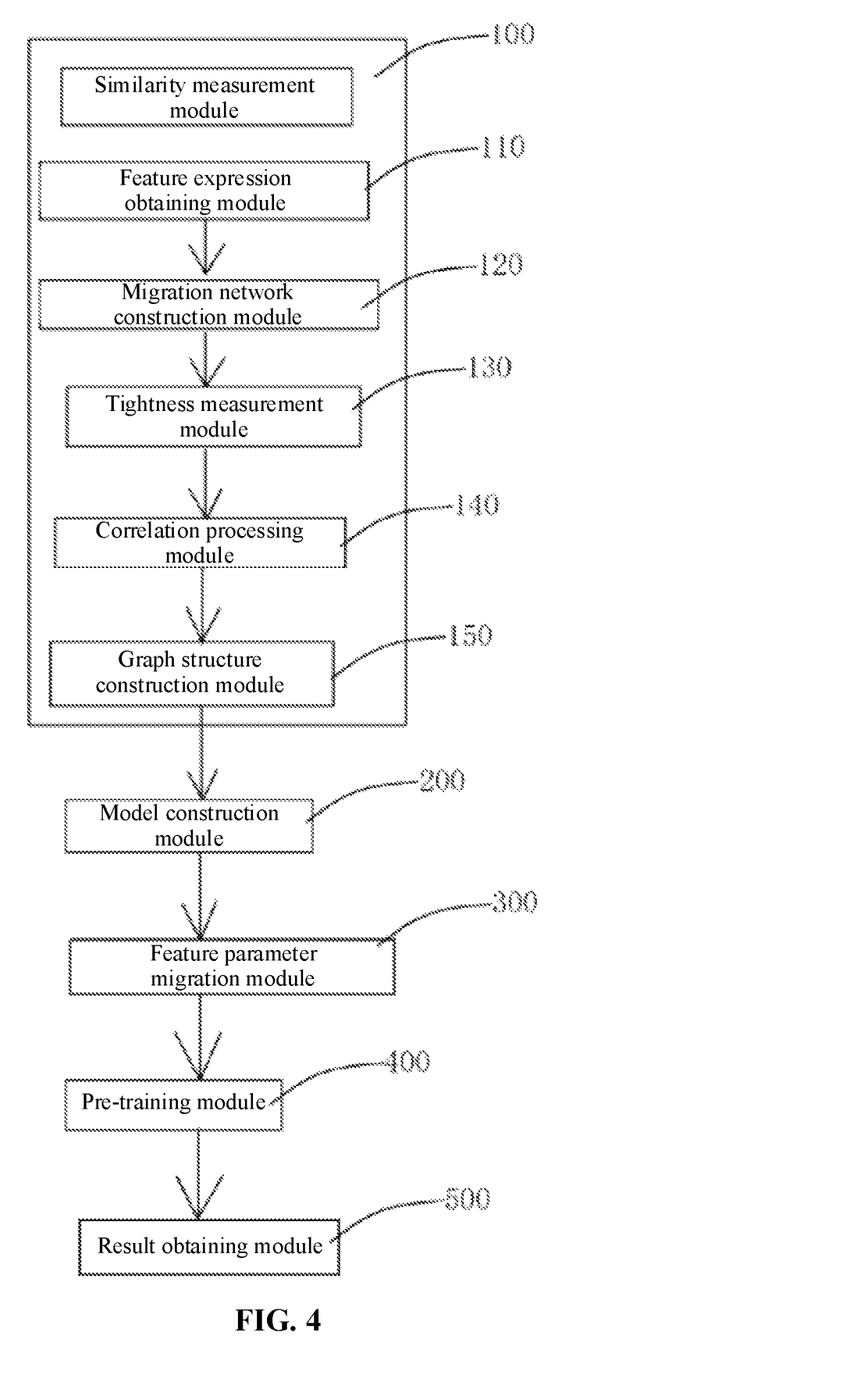
FIG. 4 shows a structure of a facial beauty prediction device based on multi-task migration according to an embodiment of the present disclosure.

Referring to FIG. 4, another embodiment of the present disclosure provides a facial beauty prediction device based on multi-task migration using the above-mentioned facial beauty prediction method, including:

a similarity measurement module 100, configured to perform similarity measurement based on a graph structure on a plurality of tasks to obtain an optimal combination of the plurality of tasks, where the plurality of tasks include a main task for facial beauty prediction and several auxiliary tasks for recognition of facial beauty factors;

a model construction module 200, configured to construct a facial beauty prediction model based on the optimal combination, where the facial beauty prediction model includes a feature sharing layer 20 for extracting shared image features of the plurality of tasks;

a feature parameter migration module 300, configured to migrate feature parameters of an existing large-scale facial image network to the feature sharing layer 20 of the facial beauty prediction model;

a pre-training module 400, configured to input facial images for training to pre-train the facial beauty prediction model; and a result obtaining module 500, configured to input a facial image to be tested to the trained facial beauty prediction model to obtain facial recognition results.

Further, the similarity measurement module 100 includes:

a feature expression obtaining module 110, configured to construct a specific network for each of the plurality of tasks and train the same to obtain a feature expression $E_s(I)$ of each task;

a migration network construction module 120, configured to match vertices and paths of the plurality of specific networks to construct a migration network among the plurality of tasks;

a tightness measurement module 130, configured to measure a task tightness among the plurality of tasks, where the task tightness is calculated according to a formula:

$$D_{s \to t} := \underset{\theta}{\arg\min} E_{I \in D} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value;

a correlation processing module 140, configured to calculate a correlation matrix among the plurality of tasks, where each element in the correlation matrix is:

$$w'_{i,j} = \frac{E_{I \in D_{test}}[D_{s_i \to t}(I) > D_{s_j \to t}(I)]}{E_{I \in D_{test}}[D_{s_i \to t}(I) < D_{s_j \to t}(I)]};$$

a graph structure construction module 150, configured to construct a directed acyclic graph structure by using each task as a node of the graph structure and the correlation matrix as a supervision value of the graph structure, and search for an optimal path by minimizing a supervision budget to obtain the optimal combination of the plurality of tasks.

Referring to FIG. 3, the facial beauty prediction model further includes a pre-processing layer 10 for pre-processing the facial images for training and the facial image to be tested, independent feature extraction layers 30 for extracting independent features of the plurality of tasks, feature fusion layers 40 for fusing the independent features with geometric features and texture features corresponding to each task, and classification layers 50.

Further, the feature sharing layer 20 includes a parameter configurator, which is used to configure basic parameters according to the optimal combination; the feature parameter migration module includes a matching module, which is configured to compare the feature parameters with the basic parameters and migrate the feature parameters corresponding to the basic parameters.

Further, the auxiliary tasks include expression recognition, gender recognition and age recognition, and the facial recognition results include a facial beauty prediction result corresponding to the main task, and an expression recognition result, a gender recognition result and an age recognition result corresponding to the auxiliary tasks.

The above-mentioned facial beauty prediction device performs similarity measurement based on a graph structure on the plurality of tasks to search for the correlation between the plurality of tasks and obtain the optimal combination of the plurality of tasks, and combines the optimal combination into the deep learning model, thereby reducing the redundancy of deep learning tasks, easing the burden of network training, and improving the efficiency and precision of network classification and recognition; and the feature parameters of the existing facial image network are migrated for learning to further reduce the cost of network training.

Another embodiment of the present disclosure provides a storage medium storing executable instructions, the executable instructions enabling a processor connected to the storage medium to process facial images according to the above-mentioned facial beauty prediction method to obtain facial beauty recognition results.

Described above are only preferred embodiments of the present disclosure, and the present disclosure is not limited to the above-mentioned embodiments. As long as the embodiments achieve the technical effects of the present disclosure by the same means, they shall fall within the protection scope of the present disclosure.

What is claimed is:

1. A facial beauty prediction method based on multi-task migration, comprising the following steps:

performing similarity measurement based on a graph structure on a plurality of tasks to obtain an optimal combination of the plurality of tasks, wherein the plurality of tasks comprise a main task for facial beauty prediction and several auxiliary tasks for recognition of facial beauty factors;

constructing a facial beauty prediction model based on the optimal combination, wherein the facial beauty prediction model comprises a feature sharing layer for extracting shared image features of the plurality of tasks;

migrating feature parameters of an existing large-scale facial image network to the feature sharing layer of the facial beauty prediction model;

inputting facial images for training to pre-train the facial beauty prediction model; and inputting a facial image to be tested to the trained facial beauty prediction model to obtain facial recognition results.

2. The facial beauty prediction method based on multi-task migration of claim 1, wherein the performing similarity measurement based on a graph structure on a plurality of tasks to obtain an optimal combination of the plurality of tasks comprises the following steps:

constructing a specific network for each of the plurality of tasks and training the specific network to obtain a feature expression $E_s(I)$ of each task;

matching vertices and paths of a plurality of the specific networks to construct a migration network among the plurality of tasks;

measuring a task tightness among the plurality of the tasks, wherein the task tightness is calculated according to a formula:

$$D_{s \to t} := \underset{\theta}{\arg\min} E_{I \in D} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value;

calculating a correlation matrix among the plurality of tasks, wherein each element in the correlation matrix is:

$$w'_{i,j} = \frac{E_{l \in D_{test}}[D_{s_i \to t}(I) > D_{s_j \to t}(I)]}{E_{l \in D_{test}}[D_{s_i \to t}(I) < D_{s_j \to t}(I)]};$$

constructing a directed acyclic graph structure by using each task as a node of the graph structure and the correlation matrix as a supervision value of the graph structure, and searching for an optimal path by minimizing a supervision budget to obtain the optimal combination of the plurality of tasks.

3. The facial beauty prediction method based on multi-task migration of claim 2, wherein the facial beauty prediction model further comprises a pre-processing layer for pre-processing the facial images for training and the facial image to be tested, independent feature extraction layers for extracting independent features of the plurality of tasks, feature fusion layers for fusing the independent features with geometric features and texture features corresponding to each task, and classification layers.

4. The facial beauty prediction method based on multi-task migration of claim 3, wherein the migrating feature parameters to the feature sharing layer comprises:

comparing the feature parameters with basic parameters which are configured by the feature sharing layer according to the optimal combination; and migrating the feature parameters corresponding to the basic parameters.

5. The facial beauty prediction method based on multi-task migration of claim 1, wherein the auxiliary tasks comprise expression recognition, gender recognition and age recognition, and the facial recognition results comprise a facial beauty prediction result corresponding to the main task, and an expression recognition result, a gender recognition result and an age recognition result corresponding to the auxiliary tasks.

6. A facial beauty prediction device based on multi-task migration, comprising:

a similarity measurement module, configured to perform similarity measurement based on a graph structure on a plurality of tasks to obtain an optimal combination of the plurality of tasks, wherein the plurality of tasks comprise a main task for facial beauty prediction and several auxiliary tasks for recognition of facial beauty factors;

a model construction module, configured to construct a facial beauty prediction model based on the optimal combination, wherein the facial beauty prediction model comprises a feature sharing layer for extracting shared image features of the plurality of tasks;

a feature parameter migration module, configured to migrate feature parameters of an existing large-scale facial image network to the feature sharing layer of the facial beauty prediction model;

a pre-training module, configured to input facial images for training to pre-train the facial beauty prediction model; and a result obtaining module, configured to input a facial image to be tested to the trained facial beauty prediction model to obtain facial recognition results.

7. The facial beauty prediction device based on multi-task migration of claim 6, wherein the similarity measurement module comprises:

a feature expression obtaining module, configured to construct a specific network for each of the plurality of tasks and train the specific network to obtain a feature expression $E_s(I)$ of each task;

a migration network construction module, configured to match vertices and paths of the plurality of specific networks to construct a migration network among the plurality of tasks;

a tightness measurement module, configured to measure a task tightness among the plurality of tasks, wherein the task tightness is calculated according to a formula:

$$D_{s \to t} := \underset{\theta}{\arg \min} E_{I \in D} [L_t(D_\theta(E_S(I)), f_t(I))],$$

where I is an input, D is a data set, $f_t(I)$ is a true value of the t-th input I, $L_t$ is a loss between the true value and a predicted value, and $E_{I \in D}$ is an expected value;

a correlation processing module, configured to calculate a correlation matrix among the plurality of tasks, wherein each element in the correlation matrix is:

$$w'_{i,j} = \frac{E_{I \in D_{test}}[D_{s_i \to t}(I) > D_{s_j \to t}(I)]}{E_{I \in D_{test}}[D_{s_i \to t}(I) < D_{s_j \to t}(I)]};$$

a graph structure construction module, configured to construct a directed acyclic graph structure by using each task as a node of the graph structure and the correlation matrix as a supervision value of the graph structure, and search for an optimal path by minimizing a supervision budget to obtain the optimal combination of the plurality of tasks.

8. The facial beauty prediction device based on multi-task migration of claim 7, wherein the facial beauty prediction model further comprises a pre-processing layer for pre-processing the facial images for training and the facial image to be tested, independent feature extraction layers for extracting independent features of the plurality of tasks, feature fusion layers for fusing the independent features with geometric features and texture features corresponding to each task, and classification layers.

9. The facial beauty prediction device based on multi-task migration of claim 8, wherein the feature sharing layer comprises a parameter configurator, which is used to configure basic parameters according to the optimal combination; and the feature parameter migration module comprises a matching module, which is configured to compare the feature parameters with the basic parameters and migrate the feature parameters corresponding to the basic parameters.

10. The facial beauty prediction device based on multi-task migration of claim 6, wherein the auxiliary tasks comprise expression recognition, gender recognition and age recognition, and the facial recognition results comprise a facial beauty prediction result corresponding to the main task, and an expression recognition result, a gender recognition result and an age recognition result corresponding to the auxiliary tasks.

* * * * *